UNITED STATES PATENT OFFICE.

ERNST FUSSENEGGER, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

AZO DYES.

1,076,756.  Specification of Letters Patent.  Patented Oct. 28, 1913.

No Drawing.  Application filed June 7, 1913.  Serial No. 772,295.

*To all whom it may concern:*

Be it known that I, ERNST FUSSENEGGER, a citizen of the Austro-Hungarian Empire, residing at Ludwigshafen-on-the-Rhine, Germany; have invented new and useful Improvements in Azo Dyes, of which the following is a specification.

I have discovered that I can obtain valuable azo coloring matters by treating, with phosgene, an azo compound which can be obtained by combining diazotized paranitranilin, or a derivative thereof containing a methyl or an alkoxy group in the ortho position to the diazotized amino group, which derivatives, for the purposes of this invention, are equivalent to paranitranilin, with 2.8-amino-naphthol-3.6-disulfonic acid in the presence of acid and then reducing the nitro group of the compound thus obtained. The compounds which are thus combined with phosgene according to my invention may be represented by the formula

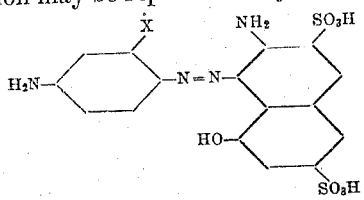

in which X means hydrogen or methyl or alkoxyl.

My new products are characterized by consisting of dark powders which yield carmine red solutions in water and blue solutions in concentrated sulfuric acid. They are insoluble in alcohol and in benzene and dye cotton red. On reduction with stannous chlorid and hydrochloric acid they give rise to a para-para-diamino-diphenyl-urea body and 1.2-diamino-8-naphthol-3.6-disulfonic acid.

The following example will serve to illustrate further the nature of my invention, which, however, is not confined to this example. The parts are by weight. Diazotize 13.8 parts of paranitranilin in the usual manner with 30 parts of 30% hydrochloric acid and 6.9 parts of sodium nitrite, and allow the diazo solution to flow into a neutral solution of 34.1 parts of the monosodium salt of 2.8-amino-naphthol-3.6-disulfonic acid. After stirring for about 12 hours, if the combination is not complete, add sodium acetate until the excess of free mineral acid has been fixed and then continue stirring until a test portion shows that no uncombined diazo compound is present. Precipitate the coloring matter by means of common salt and filter it off. Then introduce the coloring matter thus obtained into about 1,000 parts of water and reduce the nitro group by means of 36 parts of sodium sulfid at moderate temperature. Then acidify with hydrochloric acid, salt out the product and filter it off. Then dissolve it in from 1,000 to 2,000 parts of water containing an excess of sodium carbonate, filter to remove any sulfur and then, while maintaining the solution alkaline and at about 30° C., pass a current of phosgene into the solution until no unaltered monoazo coloring matter is contained therein.

The final coloring matter dyes cotton brilliant red shades of excellent fastness against the action of light and on reduction with stannous chlorid and hydrochloric acid gives rise to para-para-diamino-diphenyl-urea and 1.2-diamino-8-naphthol-3.6-disulfonic acid.

Now what I claim is:—

1. The new azo coloring matters which can be obtained from a paranitranilin body, 2.8-amino-naphthol-3.6-disulfonic acid and phosgene, which coloring matters consist, when dry, of dark powders which are insoluble in alcohol and benzene, soluble in water yielding red solutions and in concentrated sulfuric acid yielding blue solutions, and which dye cotton red shades, and, upon reduction with stannous chlorid and hydrochloric acid give rise to a para-para-diamino-diphenyl-urea body and 1.2-diamino-8-naphthol-3.6-disulfonic acid.

2. The new azo coloring matter which can be obtained from paranitranilin, 2.8-aminonaphthol-3.6-disulfonic acid and phosgene, which coloring matter consists, when dry, of a dark powder which is insoluble in alcohol and benzene, soluble in water yielding a red solution and in concentrated sulfuric acid yielding a blue solution, which dyes cotton red shades, and which upon reduction with stannous chlorid and hydrochloric acid gives rise to para-para-diamino-diphenyl-urea and 1.2-diamino-8-naphthol-3.6-disulfonic acid.

In testimony whereof I have hereunto set my hand in the presence of two subscribing witnesses.

ERNST FUSSENEGGER.

Witnesses:
 J. ALEC. LLOYD,
 JOSEPH PFEIFFER.